United States Patent
Park et al.

(10) Patent No.: US 11,435,621 B2
(45) Date of Patent: Sep. 6, 2022

(54) DISPLAY DEVICE WITH INNER PLATE AND BOTTOM COVER

(71) Applicant: LG Display Co., Ltd., Seoul (KR)

(72) Inventors: Chanhee Park, Paju-si (KR); SeungHwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/722,494

(22) Filed: Dec. 20, 2019

(65) Prior Publication Data

US 2020/0209690 A1    Jul. 2, 2020

(30) Foreign Application Priority Data

Dec. 26, 2018  (KR) ................ 10-2018-0169675

(51) Int. Cl.
*G02F 1/1337* (2006.01)
*G02F 1/1333* (2006.01)

(52) U.S. Cl.
CPC .. *G02F 1/133707* (2013.01); *G02F 1/133308* (2013.01); *G02F 2202/28* (2013.01)

(58) Field of Classification Search
CPC combination set(s) only.
See application file for complete search history.

(56) References Cited

U.S. PATENT DOCUMENTS

| | | | |
|---|---|---|---|
| 7,869,197 B2 | 1/2011 | Lee et al. | |
| 9,316,864 B2 | 4/2016 | Lee et al. | |
| 10,691,163 B2 | 6/2020 | Kim et al. | |
| 2009/0067112 A1* | 3/2009 | Takabayashi | G02F 1/13452 361/220 |
| 2017/0045678 A1* | 2/2017 | Hsu | G02B 6/0088 |
| 2018/0011368 A1* | 1/2018 | Son | G02F 1/133308 |

FOREIGN PATENT DOCUMENTS

| | | |
|---|---|---|
| CN | 101277414 A | 10/2008 |
| CN | 103901661 A | 7/2014 |
| CN | 107437590 A | 12/2017 |

OTHER PUBLICATIONS

Office Action dated Jun. 17, 2021 issued in Chinese Patent Application No. 201911221508.3 w/English Translation (12 pages).

\* cited by examiner

*Primary Examiner* — Lauren Nguyen

(74) *Attorney, Agent, or Firm* — Polsinelli PC

(57) ABSTRACT

A display device comprises a display panel; an inner plate including a rear support portion on which a rear surface of the display panel is disposed, an edge support portion which is bent at an edge portion of the rear support portion such that the edge support portion is spaced apart from an edge portion of the display panel, and an engaging end portion which is bent at and extends from an edge portion of the edge support portion; and a bottom cover including a plate support portion on which a rear surface of the rear support portion is disposed, and a side support portion which is bent at an edge portion of the plate support portion such that the engaging end portion is coupled to the side support portion.

13 Claims, 10 Drawing Sheets

DISPLAY DEVICE WITH INNER PLATE AND BOTTOM COVER

CROSS REFERENCE TO RELATED APPLICATION

This application claims priority from Korean Patent Application No. 10-2018-0169675, filed on Dec. 26, 2018, which is hereby incorporated by reference in its entirety.

BACKGROUND

Field of the Disclosure

The present disclosure relates to a display device and, more particularly, to a display device in which the rigidity of an inner plate and a bottom cover, by which a display panel is supported, is increased to prevent warpage defects of the display device as well as deformation or breakage of the display device due to an external physical impact while improving an appearance of a peripheral portion of the display device.

Description of the Background

In general, research into flat panel display devices, such as liquid crystal display (LCD) devices, plasma display panel (PDP) devices, field emission display (FED) devices, and organic light-emitting diode (OLED) display devices, has been actively undertaken. Among such flat panel display devices, LCD devices and OLED display devices have recently come to prominence, due to advantages thereof, such as adaptability to mass production, easy implementation of driving units, as well as the ability thereof to realize high resolution.

However, such a conventional display device may have problems in that parts, such as a separate reinforcing member or a middle cabinet, may be required to support the display panel, so that the number of parts and fabrication processes as well as costs increase, and the assembly may be complicated.

In particular, since the central portion of the display device where the display panel is supported is provided with the reinforcing member supporting the entire area of the rear surface of the display panel together with the middle cabinet, the number of parts, volume, and weight of the entire display device may be increased and the heat dissipation performance may deteriorate, thereby increasing the number of fabrication processes.

Therefore, a display device capable of solving the above-mentioned problems has increasingly been required.

SUMMARY

Various aspects of the present disclosure provide a display device in which the rigidity of an inner plate and a bottom cover of the display device is reinforced to minimize warping deformation of a display panel.

Also provided is a display device capable of preventing deformation or damage of a peripheral portion thereof even if a physical impact is externally applied thereto, while improving the appearance of the peripheral portion.

The present disclosure is not limited to the aforementioned description, and other aspects not explicitly disclosed herein will be clearly understood by a person having ordinary skill in the art to which the present disclosure pertains from the description provided hereinafter.

According to an aspect of the present disclosure, a display device may include a display panel, an inner plate, and a bottom cover. The inner plate includes a rear support portion on which a rear surface of the display panel is disposed, an edge support portion which is bent at an edge portion of the rear support portion such that the edge support portion is spaced apart from an edge portion of the display panel, and an engaging end portion which is bent at and extends from an edge portion of the edge support portion. The bottom cover includes a plate support portion on which a rear surface of the rear support portion is disposed, and a side support portion which is bent at an edge portion of the plate support portion such that the engaging end portion is coupled to the side support portion. The display panel is supported by the inner plate and the bottom cover, and the rigidity of the inner plate and the bottom cover is reinforced, due to edges thereof being bent and coupled with each other. Deformation or damage of a peripheral portion of the display device occurring due to a physical impact is prevented, and the appearance of the peripheral portion is improved as well.

According to aspects, the rigidity of the inner plate and the bottom cover of the display device is advantageously reinforced to minimize warpage defects of the display panel.

According to aspects, the display device can advantageously prevent deformation or damage of a peripheral portion of the display device even if a physical impact is externally applied thereto while improving the appearance of the peripheral portion.

DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
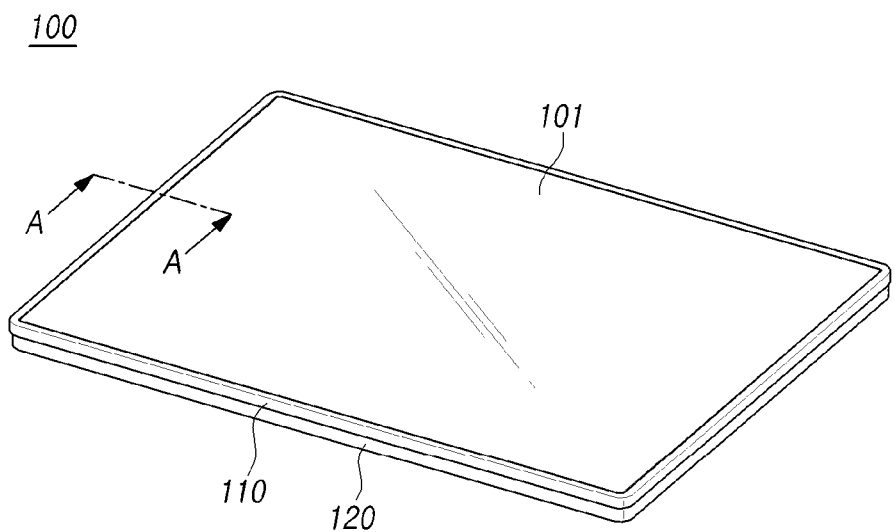
FIG. 1 is a perspective view schematically illustrating a display device according to aspects.

Hereinafter, reference will be made to aspects of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

Figure 2:
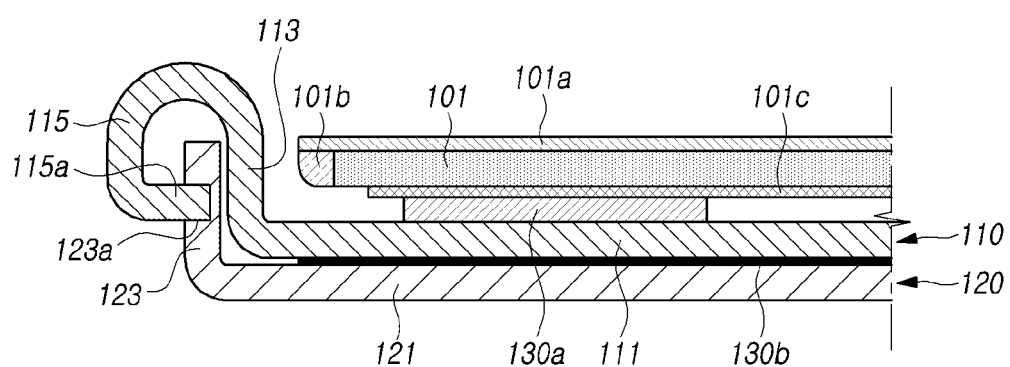
FIG. 2 is a cross-sectional view taken along line A-A in FIG. 1.

FIG. 1 is a perspective view schematically illustrating a display device according to aspects; FIG. 2 is a cross-sectional view taken along line A-A in FIG. 1.

As illustrated, the display device 100 according to aspects includes a display panel 101, an inner plate 110, and a bottom cover 120. The inner plate 110 includes a rear support portion 111 on which the rear surface of the display panel 101 is disposed, an edge support portion 113 which is bent at an edge portion of the rear support portion 111 such that the edge support portion 113 is spaced apart from an end of the display panel 101, and an engaging end portion 115 which is bent at and extends from an edge portion of the edge support portion 113. The bottom cover 120 has a plate support portion 121 on which the rear surface of the rear support portion 111 is disposed, and a side support portion 123 which is bent at an edge portion of the plate support portion 121 such that the engaging end portion 115 is coupled to the side support portion 123.

According to an exemplary aspect, the display device 100 is configured such that the display panel 101 is supported by the inner plate 110 and the bottom cover 120, and the inner plate 110 and the bottom cover 120 are reinforced by bending ends of the inner plate 110 and the bottom cover 120 and coupling the bent ends together, so that deformation or damage of a peripheral portion thereof occurring due to a physical impact is prevented, and the appearance of the peripheral portion is improved as well.

Herein, aspects may be applied irrespective of whether the display panel 101 is a liquid crystal display (LCD) panel or a light-emitting display panel.

That is, in a case in which the display panel 101 is the LCD panel, the display panel 101 may include a backlight unit illuminating the LCD panel, a bottom polarizer attached to a bottom substrate, and a top polarizer attached to a front surface of a top substrate. The specific configuration of each of the bottom substrate and the top substrate may be one of a variety of configurations well-known in the art, depending on the driving mode of the LCD panel, such as a twisted nematic (TN) mode, a vertical alignment (VA) mode, an in-plane switching (ISP) mode, and a fringe field switching (FFS) mode.

In addition, in the case in which the display panel 101 is a light-emitting display panel, the display panel 101 may include a bottom substrate in which a plurality of emission cells are arrayed in areas defined by gate lines, data lines, and power (VDD) lines, respectively, and a top substrate facing and attached to the bottom substrate.

In addition, each of the plurality of emission cells provided in the bottom substrate may include at least one switching transistor connected to a corresponding gate line among the plurality of gate lines and a corresponding data line among the plurality of data lines, at least one driving transistor connected to the switching transistor and a power (VDD) line among the plurality of power lines, and a light-emitting element (e.g. an OLED) emitting light in response to a current controlled by switching of the driving transistor. The top substrate may include a moisture absorber or the like, to protect the light-emitting elements from moisture or oxygen in the ambient air.

Here, the top substrate may further include light-emitting elements connected to the driving transistors. In this case, the light-emitting elements may be omitted from the bottom substrate.

According to aspects, in the drawings, the light-emitting display panel 101 is illustrated by way of example. Since the light-emitting display panel 101 has a self-emitting structure, a backlight unit illuminating the panel is not illustrated. In the following description, the display panel 101 will be regarded as being a light-emitting display panel by way of example.

Since an organic compound contained in a pixel array of the light-emitting display panel 101 may be deteriorated when exposed to moisture or oxygen, an encapsulation member 101c may be bonded to the rear surface of the display panel 101 to seal the pixel array in order to prevent the deterioration of pixels.

In addition, a side seal member 101b may be provided on the side surface of the display panel 101 to prevent light leakage, in which light emitted by the pixel array may be supposed to leak through the side surface of the display panel 101, and a polarizer film 101a may be attached to the front surface of the display panel 101.

Here, the side seal member 101b may be made of a polymer material to which a black pigment is added. The side seal member 101b may absorb light emitted from the pixel array, so that light does not leak through the side surface of the display panel 101.

In addition, the plurality of flexible circuit films on which ICs are surface mounted are electrically connected to the display panel 101 and the PCB using at least one of fixing members such as the side seal member 101b on the rear surface of the display panel 101 having a rectangular shape.

The plurality of flexible circuit films are attached to the display panel 101 and the PCB using an adhesive, such as a resin, by a tape-automated bonding (TAB) process. The flexible circuit films may be tape carrier packages (TCPs) or chip-on-flexible boards or chip-on-films (COFs).

Accordingly, the display panel 101 is electrically connected or coupled to the PCB via the plurality of flexible circuit films. The PCB is electrically connected to the plurality of flexible circuit films, through which a variety of signals are provided to the display panel 101 to display images.

The PCB is electrically connected to the plurality of circuit films, through which a variety of signals are provided to the display panel 101 to display images. Driver integrated circuits (ICs) and the like, for driving the display panel 101, are mounted on the PCB.

The rear surface of the display panel 101 is supported by the inner plate 110. The inner plate 110 is provided with the rear support portion 111 for supporting the rear surface of the display panel 101, the edge support portion 113 which is bent at the edge portion of the rear support portion 111 such that the edge support portion 113 is spaced apart from the edge portion of the display panel 101, and the engaging end portion 115 which is bent at and extends from the edge support portion 113.

The rear surface of the display panel 101 and the front surface of the rear support portion 111 are coupled by an adhesive member 130a so that the display panel 101 is fixed in position accurately.

Here, the adhesive member 130a may be adhesive insulating tape or adhesive heat-conductive tape formed of a flexible material having a predetermined thickness, may include an adhesive a curable resin applied thereon, or may include an adhesive pad, double-sided tape, a curable resin, or the like.

The inner plate 110 may be formed of a metal material such as aluminum, aluminum alloy, stainless steel, electrogalvanized steel sheet, or the like. In aspects of the present disclosure, the inner plate 110 may be formed of any kinds of materials other than the above-described materials so long as the inner plate can be bent at a predetermined curvature.

The bottom cover 120 is provided on the rear surface of the inner plate 110. The bottom cover 120 is provided with the plate support portion 121 on which the rear surface of the rear support portion 111 is disposed, and the side support portion 123 which is bent at and extends from the edge portion of the plate support portion 121 such that the engaging end portion 115 is coupled to the side support portion 123.

The bottom cover 120 may be formed of a metal material such as aluminum, aluminum alloy, stainless steel, electrogalvanized steel sheet, or the like. The bottom cover 120 may be formed of any kinds of materials other than the above-described materials so long as the bottom cover can be bent at a predetermined curvature.

The rear surface of the rear support portion 111 and the front surface of the plate support portion 121 are coupled by an adhesive member 130b so that the rear support portion and the plate support portion are fixed at an accurate position.

Figure 3:
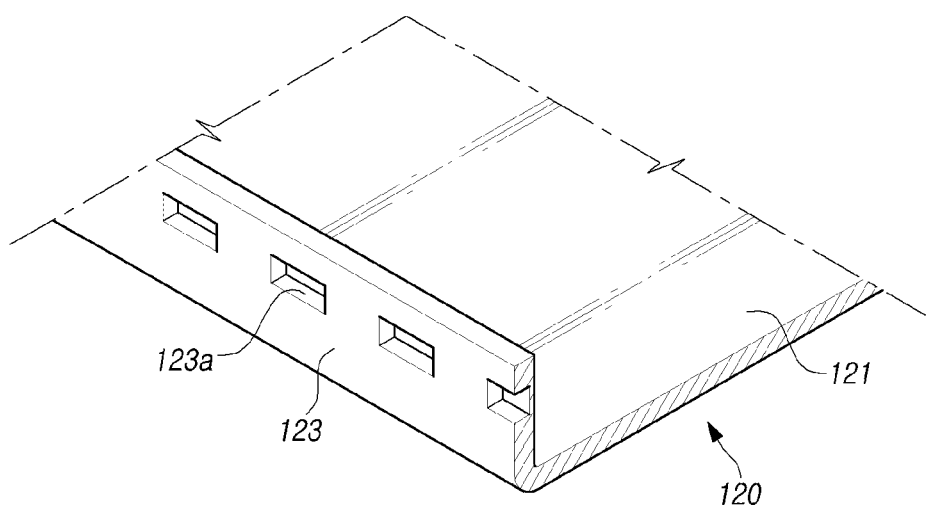
FIG. 3 is a perspective view illustrating a portion of FIG. 2.

FIG. 2 is a cross-sectional view taken along line A-A in FIG. 1, and FIG. 3 is a perspective view illustrating a portion of FIG. 2.

As illustrated in FIG. 2, a protrusion 115a extending toward the display panel 101 is provided at an end of the engaging end portion 115 and an insertion groove 123a is formed in an outer side or outer surface of the side support portion 123 so that the inner plate 110 and the bottom cover 120 can be supported and coupled together in a correct position by engagement between the protrusion 115a and the insertion groove 123a.

As illustrated in FIG. 3, two or more insertion grooves 123a may be provided such that the insertion grooves are spaced apart in the longitudinal direction of the outer side of the side support portion 123. Two or more protrusions 115a of the inner plate 110 may be provided in positions corresponding to those of the insertion grooves 123a of the bottom cover 120.

The engaging end portion 115 and the side support portion 123 may be provided along the periphery of the display device 100 or may respectively be provided on the periphery.

That is, the engaging end portion 115 may be integrally formed along the periphery of the inner plate 110 or may be separately formed at one of the peripheral portions of the inner plate 110. The side support portion 123 may also be integrally formed at the periphery of the bottom cover 120 or may be separately formed on one of the peripheral portions of the bottom cover 120.

Figure 4:
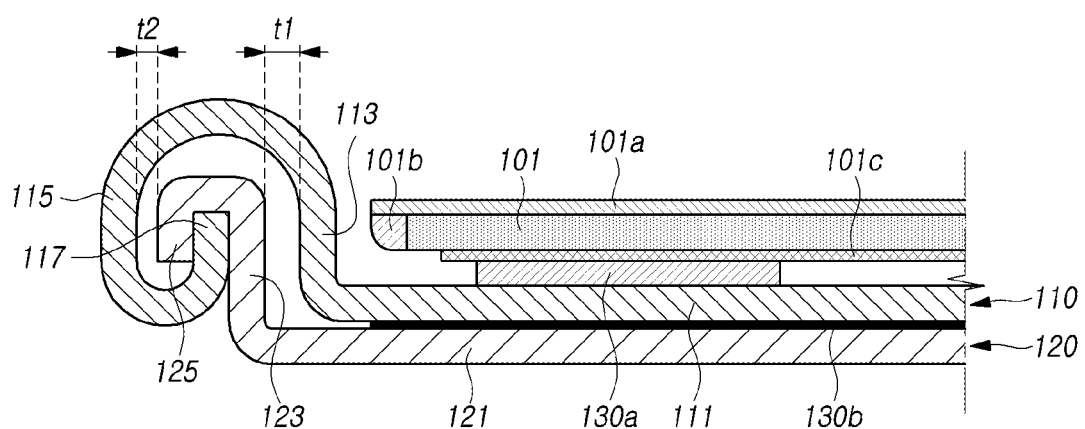
FIG. 4 is a cross-sectional view illustrating a modified aspect of FIG. 2.

FIG. 4 is a cross-sectional view illustrating a modified aspect of FIG. 2.

As illustrated in FIG. 4, the inner plate 110 may be provided with a curved edge portion 117 which is bent at the engaging end portion 115 so that the curved edge portion 117 is engaged with the side support portion 123 of the bottom cover 120. In addition, the bottom cover 120 may be provided with a fixing edge portion 125 which is bent at the side support portion 123 so that the curved edge portion 117 of the inner plate 110 is fitted into and surrounded by the fixing edge portion 125.

Accordingly, the curved edge portion 117 of the inner plate 110 and the fixing edge portion 125 of the bottom cover 120 are coupled vertically and horizontally, so that the inner plate 110 and the bottom cover 120 are firmly supported and coupled together.

Such a double layer structure of the curved edge portion 117 and the fixing edge portion 125 increases the rigidity at the peripheral portions of the inner plate and the bottom cover, so that even if a physical impact is applied to the side of the display device 100, the impact applied to the display panel 101 can be absorbed.

In particular, in this case, the secondary sectional moment I at the periphery of the bottom cover 120 also increases, so that the rigidity of the entire bottom cover 120 is enhanced, thereby minimizing warpage deformation of the display panel 101.

That is, the curvature of the display panel 101 is changed so that the curvature of the front surface or the rear surface convexly changes as the bottom cover 120 deforms. The amount d of the vertical deformation at the most convex portion of the bottom cover 120 becomes a factor that a user can perceives the warpage defects of the display panel 101.

Figure 5:
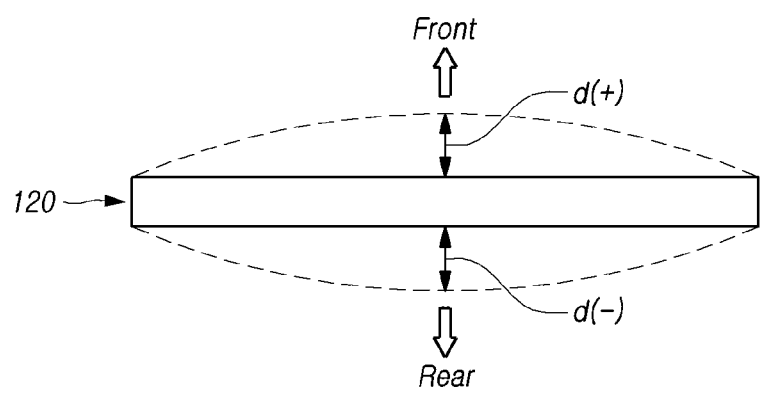
FIG. 5 is a side view schematically illustrating a variation of the bottom cover in the display device according to aspects.
Figure 6:
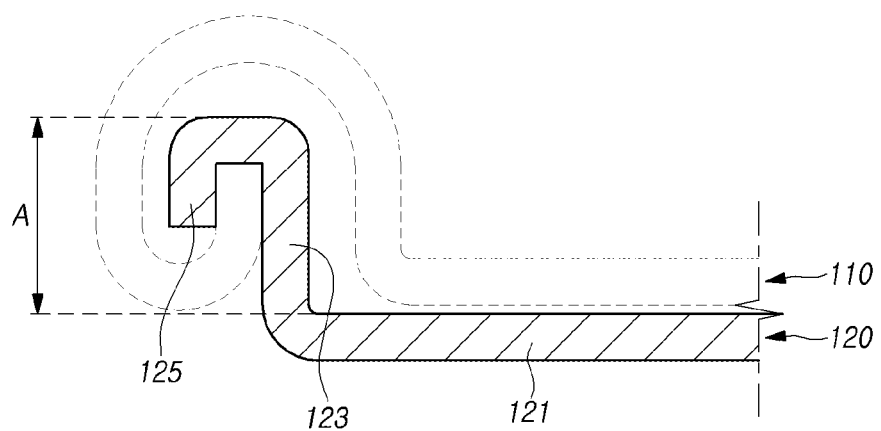
FIG. 6 is a cross-sectional view illustrating a portion of FIG. 4.
Figure 7:
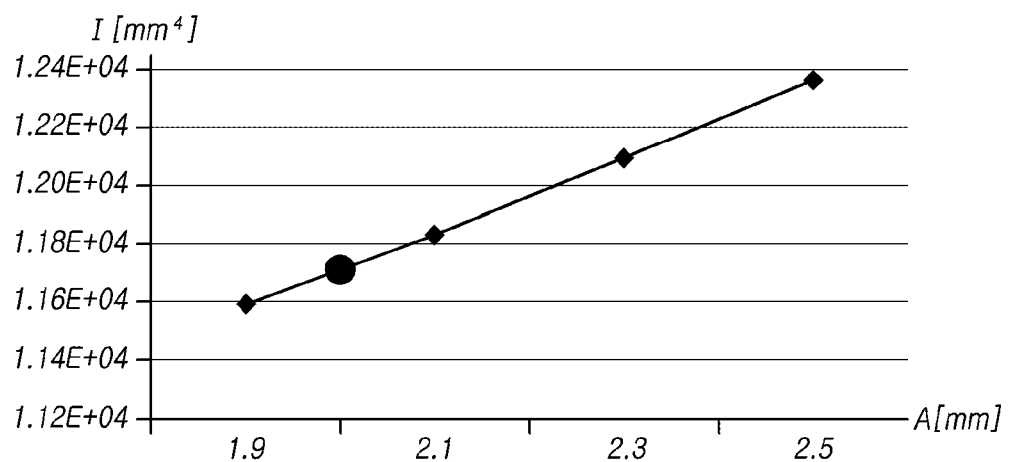
FIG. 7 is a view illustrating the relationship between the amount of deformation of the bottom cover and the secondary moment of the cross section in the display device according to aspects.

FIG. 5 is a side view schematically illustrating a variation of the bottom cover in the display device according to aspects, FIG. 6 is a cross-sectional view illustrating a portion of FIG. 4, and FIG. 7 is a view illustrating the relationship between the amount of deformation of the bottom cover and the secondary moment of the cross section in the display device according to aspects.

As illustrated in FIG. 5, assuming that the amount of deformation of the bottom cover 120 is d(+) when the bottom cover 120 is convex at the front surface, and the amount of deformation of the bottom cover 120 is d(−) when the bottom cover 120 is convex at the rear surface, a user perceives that warpage defects occur in the range of +4 mm to −2 mm.

Here, the rigidity and the deformation amount d of the bottom cover 120 are determined according to the value of the secondary moment I of the cross section of the bottom cover 120. In FIG. 7, for example, when the thickness of the bottom cover 120 is 0.6 mm, the relationship between the value of the secondary moment I of the cross section of the bottom cover 120 and the height A of the side support portion 123 of the bottom cover 120 protruding from the plate support portion 121 is shown.

That is, when the thickness of the bottom cover 120 is 0.6 mm as illustrated in FIG. 7, in order for the ordinary user not to perceive the warpage defects, the value of the secondary sectional moment I of the bottom cover 120 should be 1.17E+04 mm$^4$ or more, and the height A of the side support portion 123 of the bottom cover 120 corresponding to the secondary sectional moment may be 2.0 mm, as illustrated in FIG. 6.

As illustrated in FIGS. 6 and 7, as the height A of the side support portion 123 increases, the value of the secondary sectional moment I of the bottom cover 120 also increases. However, since the peripheral portion of the bottom cover 120 is an external design element, the height A of the side support portion 123 may have a range of approximately 2.0 mm to 2.3 mm in order to satisfy not only the external design, but also the rigidity of the bottom cover 120.

Further, as illustrated in FIG. 4, a first gap t1 is provided between the side support portion 123 of the bottom cover 120 and the edge support portion 113 of the inner plate 110, and a second gap t2 is provided between the fixing edge portion 125 of the bottom cover 120 and the engaging end portion 115 of the inner plate 110.

When a physical impact is applied to the engaging end portion 115, the engaging end portion 115 and the fixing edge portion 125 may be deformed within the first and second gap t1 and t2, so that the edge support portion 113 can be prevented from colliding with the edge portion of the display panel 101.

That is, when the display device 100 collides with other object during the movement of the display device 100, the engaging end portion 115 and the fixing edge portion 125 are deformed within the space defined by the first and second gaps t1 and t2, so that impact and vibration applied to the entire display device 100 can be absorbed and suppressed.

The first gap t1 is greater than the second gap t2 so that when the inner plate 110 and the bottom cover 120 are engaged with each other, the engagement is facilitated while the side support portion 123 of the bottom cover 120 is elastically deformed towards the display panel 101.

That is, the inner plate 110 and the bottom cover 120 are vertically coupled to each other in parallel in such a manner that the curved edge portion 117 and the fixing edge portion 125 are engaged while the curved edge portion 117 pushes on the fixing edge portion 125 so that the side support portion 123 elastically deforms and restores. Here, the first gap t1, being greater than the second gap t2, can facilitate easy elastic deformation and restoration.

Figure 8:
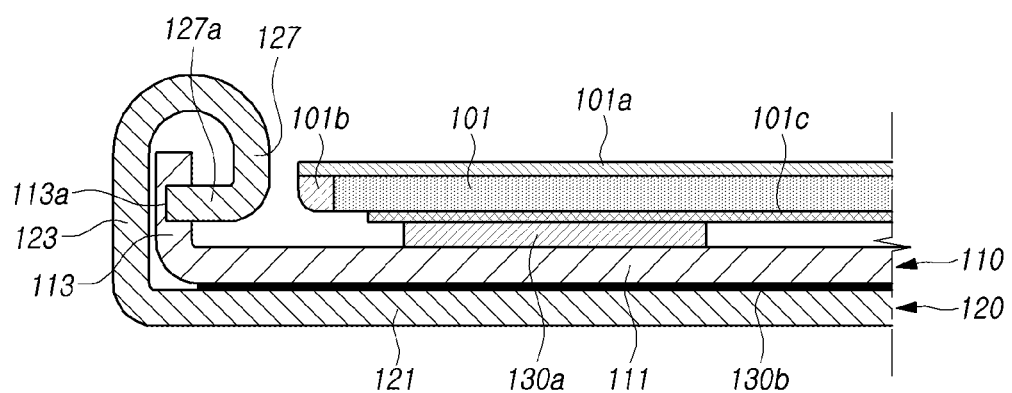
FIG. 8 is a cross-sectional view illustrating the modified aspect of FIG. 2.
Figure 9:
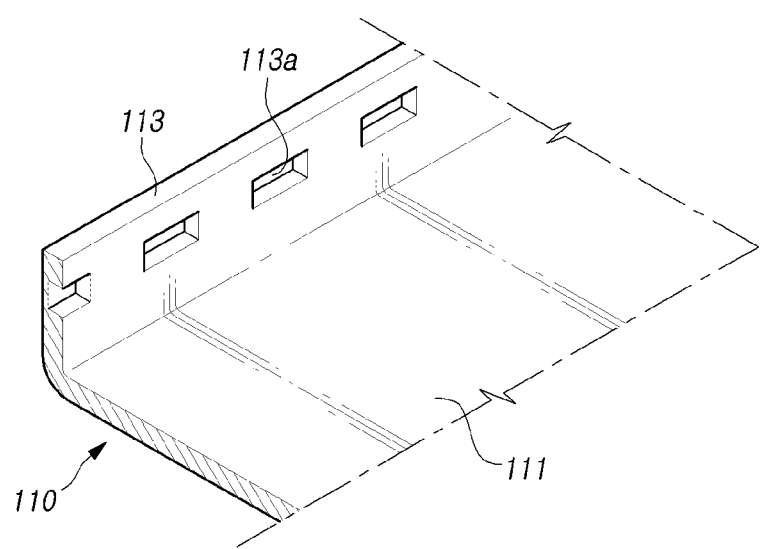
FIG. 9 is a perspective view illustrating a portion of FIG. 8.
Figure 10:
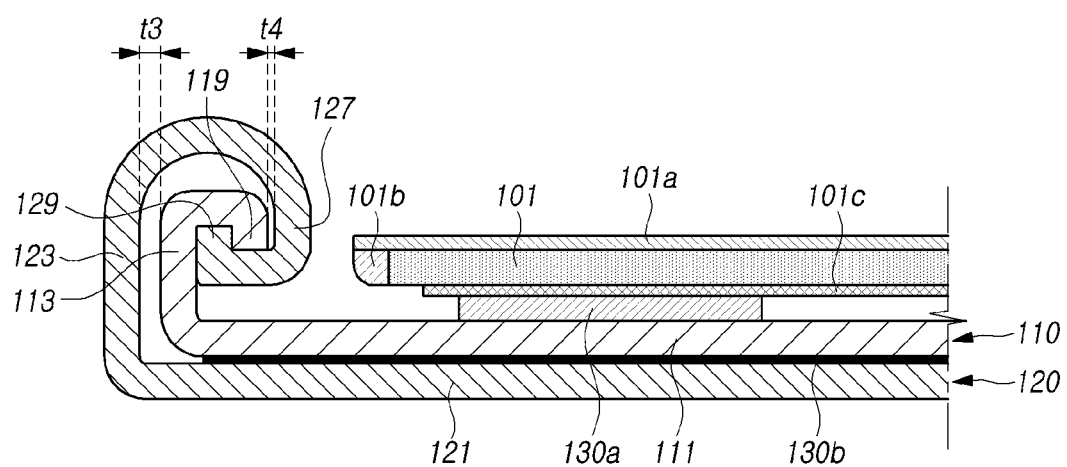
FIG. 10 is a cross-sectional view illustrating the modified aspect of FIG. 4.

FIG. 8 is a cross-sectional view illustrating the modified aspect of FIG. 2, FIG. 9 is a perspective view illustrating a portion of FIG. 8, and FIG. 10 is a cross-sectional view illustrating the modified aspect of FIG. 4.

As illustrated in FIG. 8, the bottom cover 120 may be provided with an edge support portion 127 which is bent at the side support portion 123 and disposed between the side support portion 123 and the edge portion of the display panel 101.

A protrusion 127a of the edge support portion 127 which protrudes in a direction opposite to the display panel 101 is provided at an edge portion of the edge support portion 127. A fixing groove 113a is formed in an inner surface of the edge support portion 113 so that the protrusion 127a is inserted. The inner plate 110 and the bottom cover 120 can be coupled at the correct position by the engagement between the protrusion 127a and the fixing groove 113a.

Here, two or more fixing grooves 113a may be spaced apart from each other in the longitudinal direction of the inner surface of the edge support portion 113. Two or more protrusions 127a of the bottom cover 120 may also be provided in positions corresponding to those of the fixing grooves 113a of the inner plate 110, respectively.

Further, the inner plate 110 may be provided with a receiving edge portion 119 which is bent at the edge support portion 113 and disposed between the edge support portion 113 of the inner plate 110 and the edge support portion 127 of the bottom cover 120, and the bottom cover 120 may be provided with an insertion edge portion 129 which is bent at the edge support portion 127 and inserted between the edge support portion 113 and the receiving edge portion 119.

Thus, the receiving edge portion 119 of the inner plate 110 and the insertion edge portion 129 of the bottom cover 120 are coupled vertically and horizontally, so that the inner plate 110 and the bottom cover 120 can be firmly supported and coupled together.

Particularly, in this case, as described above, the secondary sectional moment I at the edge portion of the bottom cover 120 also increases, so that the overall rigidity of the bottom cover 120 is enhanced, thereby minimizing warpage of the display panel 101.

A third gap t3 is provided between the side support portion 123 and the edge support portion 113 and a fourth gap t4 is provided between the receiving edge portion 119 and the edge support portion 127 such that the third gap t3 is greater than the fourth gap t4. Thus, when the inner plate 110 and the bottom cover 120 are coupled to each other, the coupling is performed while the edge support portion 113 of the inner plate 110 is elastically deformed in a direction opposite to the display panel 101.

That is, the inner plate 110 and the bottom cover 120 are vertically coupled to each other in parallel in such a manner that the receiving edge portion 119 and the insertion edge portion 129 are engaged while the insertion edge portion 129 pushes the receiving edge portion 119 so that the edge support portion 113 elastically deforms and restores. Here, the third gap t3, being greater than the fourth gap t4, can facilitate easy assembly through easy elastic deformation and restoration.

In the meantime, while the display panel has been described and illustrated as being a light-emitting display panel by way of example in the foregoing aspects, the present disclosure may also be applicable to a liquid crystal display panel. In this case, the general components of the liquid crystal display panel are well known in the art to which the aspects belong, so the detailed description thereof will be omitted.

As set forth above, according to aspects, the rigidity of the inner plate and the bottom cover of the display device can be advantageously reinforced to minimize warpage defects of the display panel.

According to aspects, the display device can also advantageously prevent deformation or damage of a peripheral portion of the display device even if a physical impact is externally applied thereto while improving the appearance of the peripheral portion.

Although all of the components constituting aspects have been described as being combined together or as operating in concert with each other, the present disclosure is not necessarily limited thereto. One of more of components of the present disclosure may be selectively and operatively combined within the scope of the object of the present disclosure.

It will be understood that the terms "comprise," "include," "have," and any variations thereof used herein are intended to cover non-exclusive inclusions unless explicitly described to the contrary. Unless otherwise specified, all terms including technical and scientific terms used herein have the same meaning as commonly understood by a person having ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing aspects disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A display device comprising:
   a display panel;
   an inner plate including a rear support portion on which a rear surface of the display panel is disposed, an edge support portion which is bent at an edge portion of the rear support portion such that the edge support portion is spaced apart from an edge portion of the display panel, and an engaging end portion which is bent at and extends from an edge portion of the edge support portion; and
   a bottom cover including a plate support portion on which a rear surface of the rear support portion is disposed, and a side support portion which is bent at an edge portion of the plate support portion such that the engaging end portion is coupled to the side support portion,
   wherein the inner plate further includes a curved edge portion that is bent at the engaging end portion and disposed between the engaging end portion and the side support portion, and the bottom cover further includes a fixing edge portion that is bent at the side support portion to surround the curved edge portion such that the curved edge portion is inserted into the fixing edge portion,
   wherein the curved edge portion of the inner plate and the fixing edge portion of the bottom cover are coupled together, and the curved edge portion of the inner plate is disposed between the fixing edge portion and the side support portion of the bottom cover,
   wherein the curved edge portion of the inner plate is disposed to be parallel with the engaging end portion of the inner plate and engaged with the fixed edge portion and the side support portion of the bottom cover vertically and horizontally,
   wherein the curved edge potion is perpendicular to extended directions of a longest length of the plate support portion of the bottom cover, and
   wherein the edge support portion and the engaging end portion are connected by a bending portion having a curvature that is protruded beyond the display.

2. The display device according to claim 1, wherein the display panel and the rear support portion of the inner plate are coupled by an adhesive member.

3. The display device according to claim 1, wherein the rear support portion of the inner plate and the plate support portion of the bottom cover are coupled by an adhesive member.

4. The display device according to claim 1, wherein the engaging end portion is provided with a protrusion protruding from an edge portion thereof toward the display panel, and the side support portion is provided with an insertion groove in an outer surface thereof, the protrusion being inserted into the insertion groove.

5. The display device according to claim 4, wherein the insertion grooves include two or more insertion grooves spaced apart from each other along a longitudinal direction of the outer surface of the side support portion, and the protrusion is provided in positions corresponding to the two or more insertion grooves.

6. The display device according to claim 1, wherein the side support portion of the inner bottom and the edge support portion of the inner plate are distanced by a first gap and the fixing edge portion of the bottom cover and the engaging edge portion of the inner plate are distanced by a second gap, and
   wherein the first gap is greater than the second gap.

7. The display device according to claim 1, wherein the bottom cover includes an edge support portion that is bent at the side support portion and disposed between the side support portion of the bottom cover and the edge portion of the display panel.

8. The display device according to claim 7, wherein the edge support portion of the bottom cover is provided with a protrusion protruding in a direction opposite to the display panel, and the edge support portion of the inner plate is provided with an insertion groove in an inner surface thereof, and
   wherein the protrusion is inserted into the insertion grooves.

9. The display device according to claim 8, wherein the insertion grooves include two or more insertion grooves spaced apart from each other along a longitudinal direction of the outer surface of the side support portion, and the protrusion is provided in positions corresponding to the two or more insertion grooves.

10. The display device according to claim 7, wherein the inner plate includes a receiving edge portion that is bent at the edge support portion of the inner plate and disposed between the edge support portion of the inner plate and the edge support portion of the bottom cover.

11. The display device according to claim 10, wherein the bottom cover further includes an insertion edge portion that is bent at the edge support portion of the bottom cover and inserted between the receiving edge portion and the edge support portion of the inner plate.

12. The display device according to claim 11, wherein the side support portion and the edge support portion of the inner plate are distanced by a third gap and the receiving edge portion and the edge support portion of the bottom cover are distanced by a fourth gap, and
    wherein the third gap being greater than the fourth gap.

13. The display device according to claim 1, wherein the fixing edge portion is spaced apart from the engaging end portion, and the side support portion is spaced apart from the edge support portion.

* * * * *